Dec. 20, 1938.   H. C. RASSMANN   2,141,044
HILL DROPPING SEEDER
Filed Aug. 7, 1935   2 Sheets-Sheet 1

Inventor
Hugo C. Rassmann
By
Attorney

Patented Dec. 20, 1938

2,141,044

UNITED STATES PATENT OFFICE 2,141,044

HILL DROPPING SEEDER

Hugo C. Rassmann, Beaver Dam, Wis.

Application August 7, 1935, Serial No. 35,154

3 Claims. (Cl. 111—34)

This is a hill dropping seeder which is particularly adapted for dropping seeds in hills such as sugar beets and the like, where it is desirable that the hills be spaced equally apart to facilitate the harvesting of the beets when they are mature. A feature resides in a simple construction of seeder which does not need a separate feeding mechanism to meter out the seed as has ordinarily been used heretofore, because the same is designed with a belt which travels across the bottom of the seed supply picking up the seed.

A feature of this seeder resides in that it is designed in such a manner that approximately the same number of seeds will be in each hill as each pocket of the seeder will be filled as it passes across the bottom of the seed supply. The number of seeds for each hill may be regulated by different size pockets. The seeder is adjustable so that different size pockets may be used on the endless carrier.

A further advantage and feature of my seeder resides in its simple unitary, compact construction wherein a seed pocketed endless belt having the desired size seed pockets supported thereon is adapted to pass over end pulleys or sprockets and may be driven by a shaft which extends outside of the housing that incloses the seed pocketed endless belt. The belt may be formed of a V-type flexible construction, made of fabric and rubber, or leather, and the same may be notched out with the desired size seed pockets formed therein to form a simple seed pocketed belt which is driven from the outside of the casing inclosing the same through the shaft of one of the pulleys over which the belt extends.

In my seeder the seed hopper may be of the desired size to carry a supply of seed which permits the seeds to enter the seed pocketed belt freely. The seed hopper may be of a sufficient size to carry the desired number of seeds or it may be smaller and the seeds may be fed to the same from an auxiliary seed hopper if it is desired. Further, my seeder is of a compact nature extending close to the ground and having a smooth outer casing from which depends the furrow opening plow and there are no sprockets or chains or chain guards outside to catch against anything in the operation of the seeder in the field. Beet seeds are light in weight and it is not easy to ordinarily control automatic or mechanical sowing of the same so that the desired number of seeds may be dropped into each hill and so that the hills will be properly spaced apart to permit the beets to be harvested by a beet harvesting machine in a practical manner.

With my unitary compact simple design of seeder, I am able to positively control the seeds so that they may be sown in hills as desired.

In the drawings forming part of the specification:

Figure 1 diagrammatically illustrates the connection of the seeder to the driving axle of the device.

Figure 1:
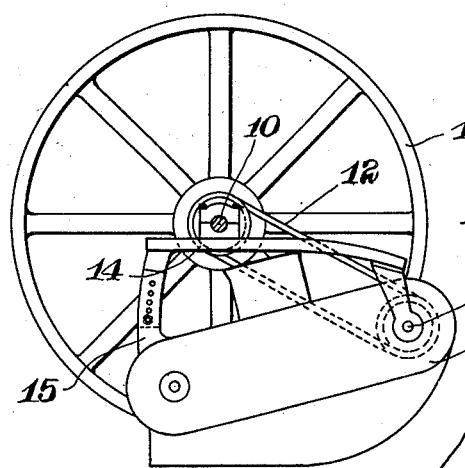
Figure 2:
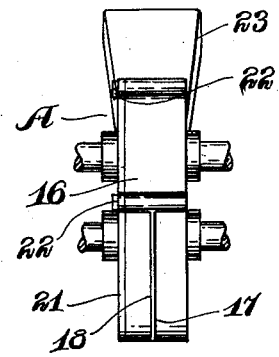
Figure 2 is a front view of the seeder.

The drawings illustrate my compact unitary seeder A which is connected to the driving axle 10 of the operating mechanism which is driven by the wheels 11. A suitable driving chain 12 extends from the driving axle 11 to rotate the upper shaft 13 of my seeder A. The seeder A is adapted to be supported on its upper end by the bracket 14 which adjustably supports the front upper end of the seeder A. The rear end of the seeder is adapted to be supported by the adjustable bracket 15.

The seeder A is formed with a housing 16 which is shaped to provide a smooth outer portion so that the seeder may travel through the field without catching against anything. There are no outer working parts which are apt to get clogged up or pick up anything in the operation of the seeder. The casing 16 is formed with a furrow opener or plow 17 which has a sharp front edge 18. The furrow opener 17 increases in width toward the rear end so as to provide the hollow portion 19 out of which the seed drops into the hill from the opening 20. The casing 16 is closed on one side by the cover 21 which is held removable by the bolts 22.

The seeder A may be provided with a seed hopper 23 in which the desired supply of seeds 24 may be contained. The seeds 24 may be fed into the hopper from a larger supply hopper if it is desired, or the seed hopper 23 may be made large enough to carry the desired supply of seeds. The hopper 23 is formed as a portion of the casing of the seeder A.

The seeder A is provided with a pocketed endless belt 24 which is formed with seed pockets 26 into which the seeds 24 are collected from the hopper 23 as the pocketed belt 25 passes in the direction of the arrow toward the pulley or sprocket 27. The belt 25 may be made of fabric and rubber with a V-shaped bottom and in which case the pulley 27 would have a V-shaped groove to carry the same. An idle pulley 28 which rotates on the shaft 29 carries the rear end of the belt 25, the shaft 13 carrying the front pulley 27 and is preferably the driving shaft for the seeder A. The shaft is elevated from the ground and permits the chain or other driving member 12 to operate the shaft 13.

Figure 3:
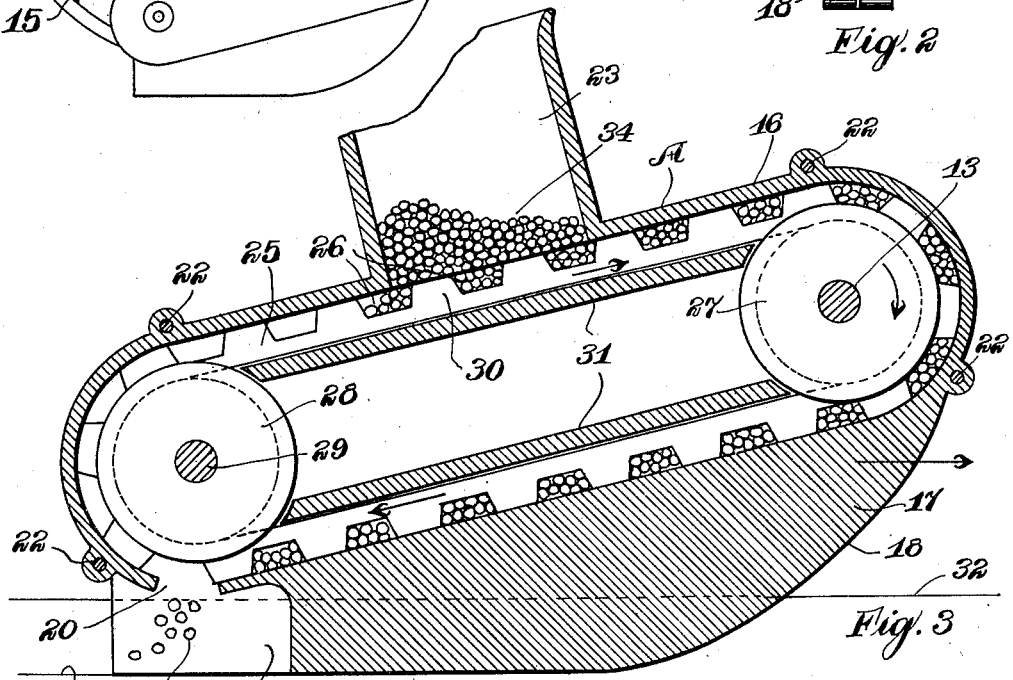
Figure 3 is an enlarged sectional side elevation of the seeder.
Figure 4:
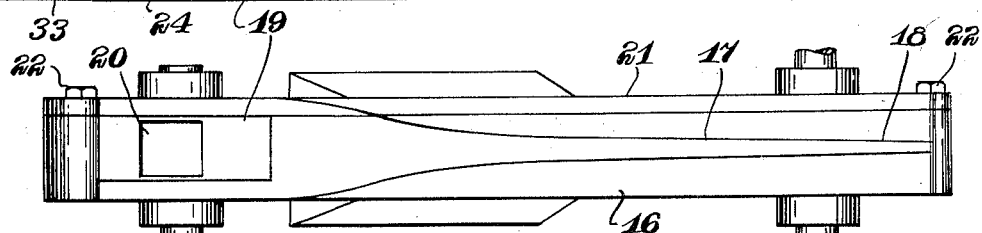
Figure 4 is a bottom view of the seeder.

The carrier 12 may be of any suitable construction, being formed of a chain with the seed pockets 26 supported thereby and in which case instead of pulleys 27 and 28, sprockets would be provided to carry the chain. It is also obvious that the seed pockets 26 may be of any suitable size and the number of seed pockets may be varied so that the spaces 30 between the pockets 26 in the endless carrier 25 may be varied in size to space the pockets 26 as far apart as may be desirable. Suitable guides 31 are provided for the endless carrier 25. In Figure 3 the enlarged sectional elevation of the seeder A shows an approximate diagrammatic position of the seeder in relation to the ground line 32. The depth of the seed furrow 33 is also illustrated and the manner in which the seeds are dropped in hills is shown with the pocketed endless seed carrier 25 operating in the direction of the arrows so that the beet seeds 24 may be dropped in hills as the seeder A travels in the direction of the arrow along the ground.

Figure 5:
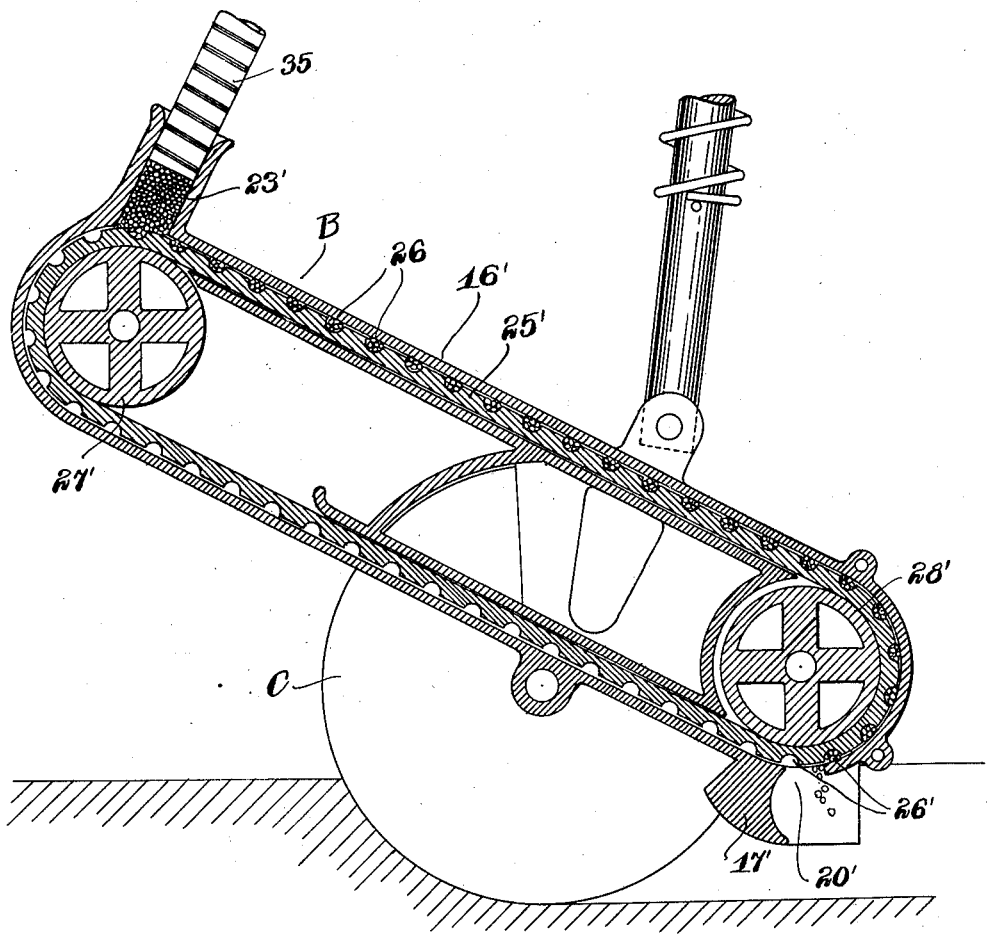
Figure 5 is an enlarged vertical section of a form of my seeder.

The seeder B, illustrated in Figure 5 is provided with a casing 16' wherein the endless V-belt 25' is adapted to operate in the direction of the arrows. The belt 25' is formed with seed pockets 26'. It will be noticed that in this seeder B the belt travels in the opposite direction to the travel of the seeder. The front pulley 27' carries the front or upper end of the belt 25', while the lower pulley 28' carries the lower end of the belt. By causing the belt 25' to travel in the direction indicated, the seed is carried around the wheel 28' and as the seed pockets 26' reach the seed discharge opening 20', they are thrown out into the ground in hills.

In the seeder B the shoe 17' is of a short nature and the seed furrow is opened by a disc C, or a pair of discs, only one of which is shown. In this seeder B the seed may be metered down through the seed feed tube 35 and any suitable seed metering means may be used, not illustrated in the drawings, the idea here being to meter the seeds through the tube 35 into the small seed hopper 23'.

The cover 21 may be removed at any time and the endless pocketed seed carrier belt 25 changed, as well as the pulleys or sprockets 27 and 28. This provides an adjustable means for my seeder A so that the endless carrier 25 may be changed at any time and replaced with a new carrier or a carrier having different size seed pockets or seed collectors placed in the seeder A.

The compact nature of my seeder will be apparent from the front and bottom view of the same which shows its narrow sleek construction. With a seeder of this nature, the same will slide along through the ground, operating in perfect timed relation to space the desired number of seeds for each hill in spaced apart hills so that beets shown in this manner may be harvested by a beet harvester which is designed to lift the beets out of the ground and top the same all in automatic timed relation. I have found that a beet seeder of this character is very desirable owing to the nature of beet seeds which are light in weight and hard to handle to mechanically and automatically drop the same into equally spaced apart hills. It is apparent that my seeder A may be operated by a checkrow mechanism which is not herein illustrated. Such a checkrowing device would be readily adaptable to operate the seeder A intermittently so that the beet seeds would be dropped in equally spaced apart hills as the seeder travels along the ground.

It is also apparent that any type of operating mechanism may be employed to operate my seeder A and to support the same in relation to the ground. The seeder A is supported adjustably by the bracket members 14 and 15 so that it may be raised and lowered into the desired position in relation to the ground. The simple, compact nature, together with a small number of operating parts is an important advantage in the design and construction of my seeder to provide an automatic seeding device of a character wherein beet seeds, and other seeds of a similar character, may be sown. The structure, design and arrangement of the parts are only illustrative and any interpretation of the same should be made within the scope of the following claims with such variations as may be readily apparent to those skilled in the art. Further, bearing in mind that while seeders of various characters have been provided heretofore they have not possessed the simple, practical nature as herein set forth, and thus I believe have failed to be practical in accomplishing the desired results.

I claim:

1. A seeder including a casing having an open portion, an endless seed carrier, channels in said casing for guiding said seed carrier, a seed hopper past which said carrier operates to pick up seeds into spaced apart seed compartments, wheels for supporting and operating said carrier, a cover for closing said open portion of said casing being removable to permit the seed carrier to be changed when desired, and seed furrow opening means through which the seeds are discharged in hills equally spaced apart in the operation of said seeder.

2. A unitary compact automatic seeder for beet seeds and the like comprising a casing having a seed hopper formed therein, a longitudinal channel extending in said casing, an endless seed carrier operable in said channel, a spaced pair of rotatable carrier supports, means for moving said carrier by said hopper, a seed furrow opener extending longitudinally of said seeder below said carrier, a seed discharge opening through said seed furrow opener, and means for pivotally supporting said casing on the axis of one of said carrier supports for adjustably supporting said seeder in relation to the ground.

3. A seeder for beet seeds and the like including a narrow shoe-like member, a seed hopper formed in said member, a removable cover on one side of said member, a depending sharp ended fin-like seed furrow shoe, a seed discharge opening through said shoe, an endless seed carrier, said member having a channel in said member in which said carrier is adapted to operate, means supporting said carrier to hold a portion thereof inverted, and means for operating said carrier automatically to pick up the desired number of seeds from said hopper, draw the seeds with said inverted carrier over a portion of said channel, and discharge the same through said shoe to sow seeds in hills with each hill equally spaced apart a predetermined distance.

HUGO C. RASSMANN.